(No Model.) 3 Sheets—Sheet 1.

W. G. TEAL.
LISTER CULTIVATOR.

No. 556,112. Patented Mar. 10, 1896.

FIG-1-

Witnesses
Jas. K. McCathran
V. B. Hillyard

Inventor
Wilber G. Teal
By his Attorneys,
C. A. Snow & Co.

(No Model.) 3 Sheets—Sheet 3.
W. G. TEAL.
LISTER CULTIVATOR.
No. 556,112. Patented Mar. 10, 1896.
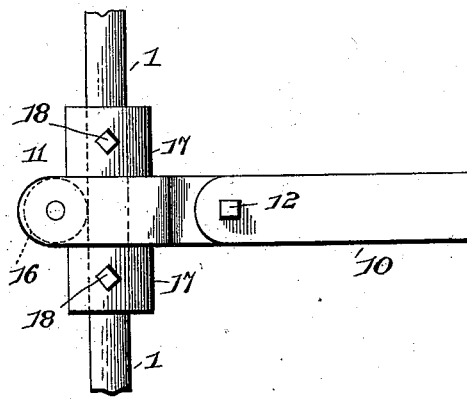
FIG. 3.
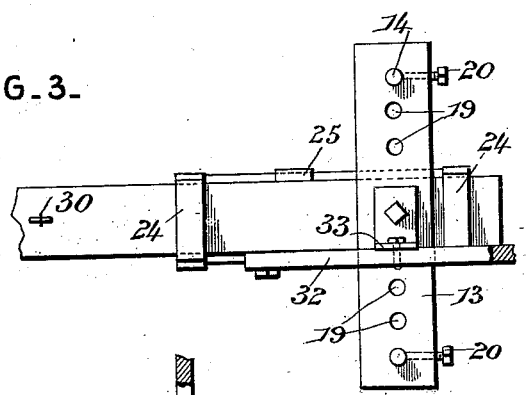
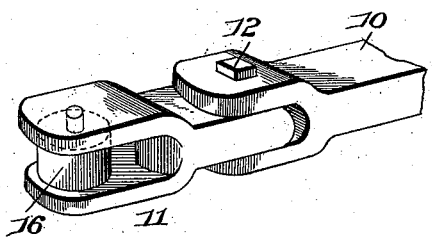
FIG. 4.
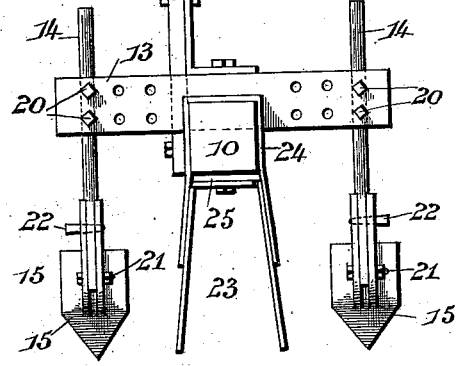
FIG. 5.
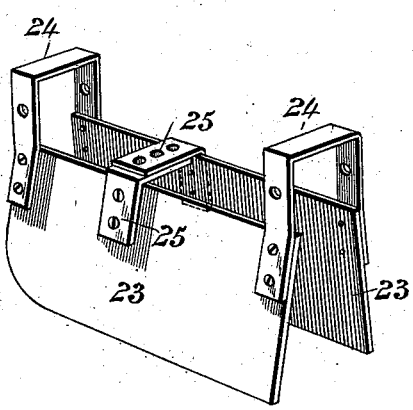
FIG. 6.
FIG. 7.
Witnesses
Jas. K. McCathran
V. B. Hillyard
Inventor
Wilber G. Teal
By his Attorneys,
C. A. Snow & Co.

UNITED STATES PATENT OFFICE.

WILBER G. TEAL, OF CURTIS, NEBRASKA, ASSIGNOR OF ONE-THIRD TO ARTHUR M. JOHNSON, OF SAME PLACE.

LISTER-CULTIVATOR.

SPECIFICATION forming part of Letters Patent No. 556,112, dated March 10, 1896.

Application filed September 28, 1895. Serial No. 564,008. (No model.)

*To all whom it may concern:*

Be it known that I, WILBER G. TEAL, a citizen of the United States, residing at Curtis, in the county of Frontier and State of Nebraska, have invented a new and useful Lister-Cultivator, of which the following is a specification.

This invention has for its object to provide a cultivator for general purposes and most especially for listing, and which can be used either as a walking or riding implement, as required. The implement is devised to be drawn over the field by a team of either two or three horses, and is constructed so that the weight of the driver can be utilized to relieve the animals of the weight of the pole or tongue, and to provide and couple the beams to the axle so that they can be separated or brought together, according to the distance apart of the rows of plants.

The machine can be used with or without fenders, according to the height and strength of the plants, and the cultivator-shovels can be adjusted vertically and moved laterally to adapt the implement to the peculiar nature of the work to be performed.

The primary object of the invention is the provision of a cultivator which will combine simplicity of construction, compactness in the arrangement of its parts, and which will be durable and attain the desired end in an efficient and satisfactory manner.

Various other objects and advantages are contemplated and will appear as the nature of the invention is better understood; and to this end the improvement consists in certain novel features of construction and combinations of parts substantially as herein illustrated, described, and specifically claimed.

An embodiment of the invention is illustrated in the accompanying drawings, in which—

Figure 1:
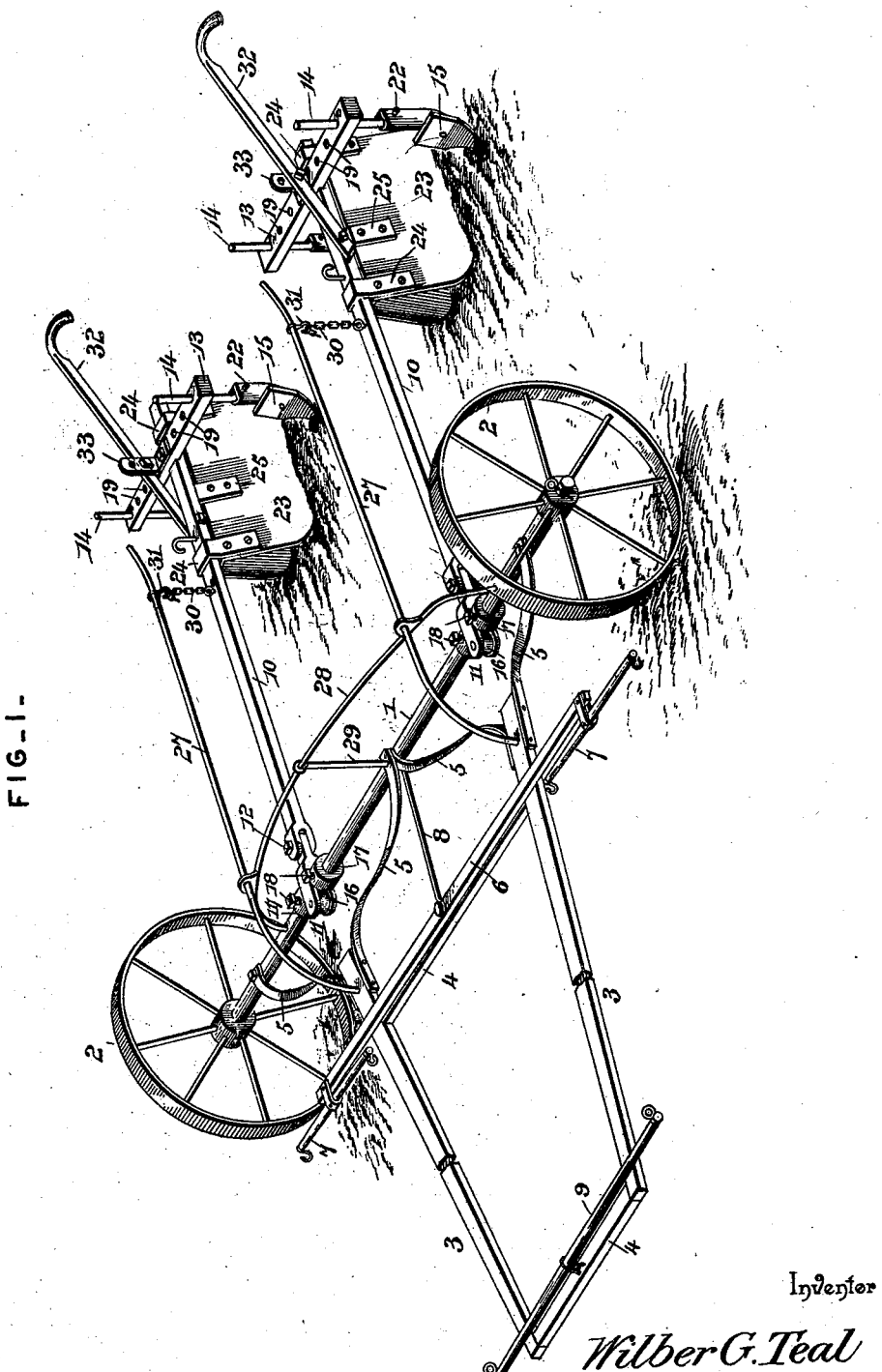
Figure 2:
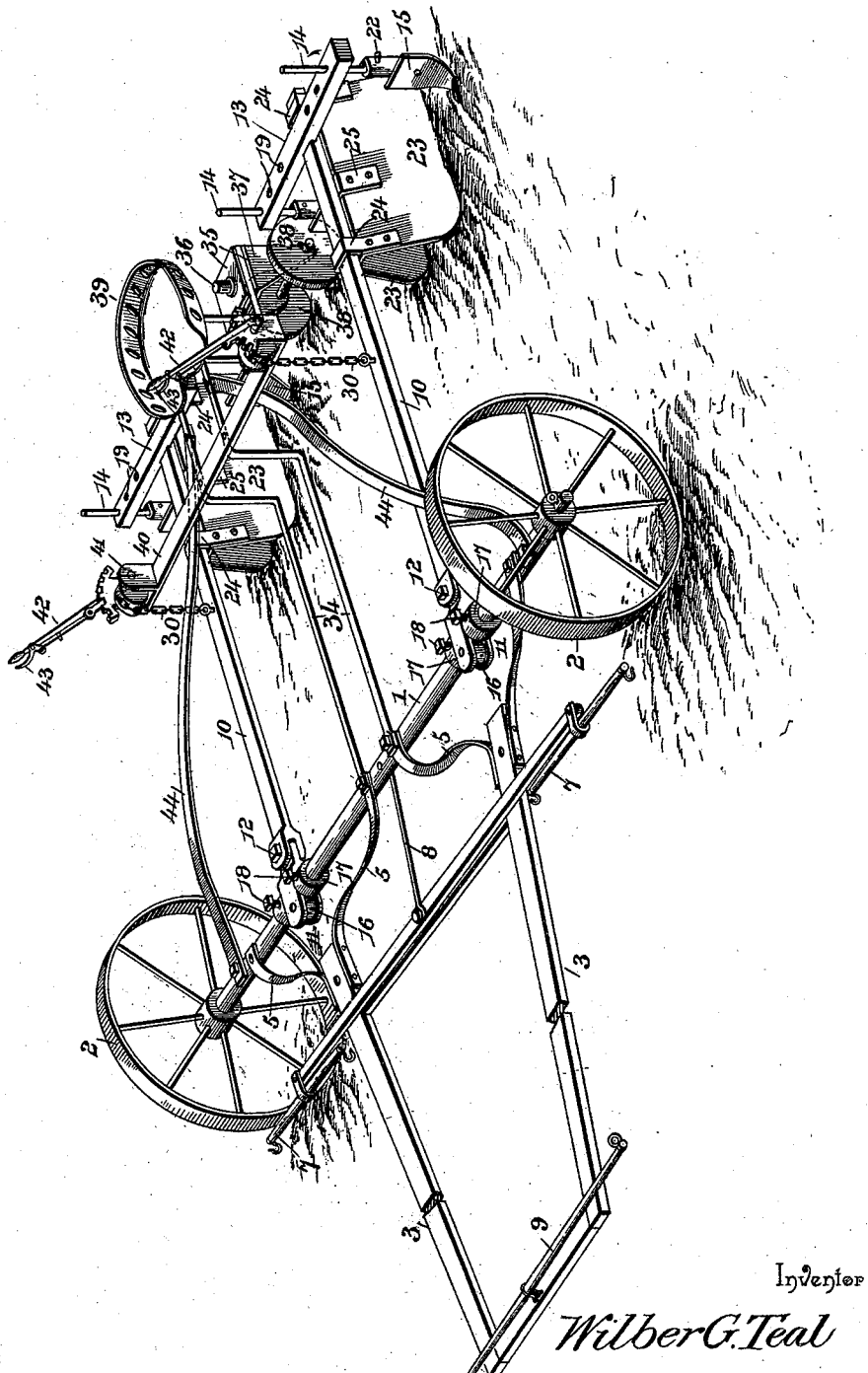

Figure 1 is a perspective view of an implement constructed in accordance with this invention and adapted to be used as a walking-cultivator. Fig. 2 is a view similar to Fig. 1, showing the implement adapted for use as a riding-cultivator. Fig. 3 is a top plan view of a cultivator-beam, showing the connections between it and the axle. Fig. 4 is a detail view of the coupling for connecting a cultivator-beam to the axle. Fig. 5 is a rear elevation of a cultivator-beam, showing the parts carried thereby. Fig. 6 is a detail view of a fender. Fig. 7 is detail view showing the manner of connecting a cultivator-shovel with its standard.

The same reference-numerals indicate corresponding parts in all the figures of the drawings.

The axle 1 is provided at its ends with the ground-wheels 2, which are mounted so as to revolve loosely thereon. The pole or tongue is composed of similar bars 3 and connecting cross-bars 4, and is attached to the axle by means of hounds 5, two being provided for each bar 3, and these hounds are rigidly secured at their inner ends to the axle, so that the pole and axle will move together when raising and lowering the front end of the pole. The doubletree 6 is connected in the usual way with the inner cross-bar of the pole and is provided at its outer ends with singletrees 7, to which the team is hitched. A rod 8 connects the upper end of the doubletree-fastening bolt with the axle and serves to brace the said doubletree and prevent its bolt from inclining forwardly when the cultivator is drawn over the field. The neck-yoke 9 has connection with the front cross-bar of the pole, and the breast chains or straps of the team are hitched thereto in the usual manner.

When a team of two horses is employed for drawing the implement, they are hitched to the singletrees upon opposite sides of the pole or tongue, and when a team of three horses is provided the middle horse occupies the space between the longitudinal bars 3.

The cultivator-beams 10 are cleft at their front ends and have pivotal connection with the rear ends of the coupling 11 by means of pivots or bolts 12, and they are supplied at their rear ends with short cross-bars 13, to which are attached the standards 14, bearing the cultivator-shovels 15 at their lower ends. The couplings 11 are notched in their front ends to receive the axle 1 upon which they are fitted, and the open end of the notch is closed by a vertically-disposed roller 16, which obtains a bearing against the front side of the axle when the cultivator-beam is shifted laterally. The closed end of the notch is bev eled rearwardly in opposite directions to obviate a binding of the coupling upon the axle when shifting the position of the cultivator-beam. Collars 17 are placed upon the axle 1 and are arranged one upon each side of the couplings, and these collars are secured in the adjusted position by binding-screws 18 in the usual manner.

When it is required for any purpose to change the position of the cultivator-beams with reference to the axle, the collars 17 are moved laterally upon the axle, so that the proper positioning of the cultivator-beams may be attained, and after the said beams have been moved to the required location the respective collars are brought close against the sides of the couplings and the binding-screws 18 are turned so as to fix the position of the collars and thereby hold the cultivator-beams in their adjusted position.

The cross-bars 13, which may be either round or square, tubular or solid, are formed with a series of vertically-disposed openings 19 to receive the standards 14, which latter are adapted to be moved vertically or turned in the said openings 19 so as to secure the required adjusted position of the cultivator-shovels 15 to suit the height of the plants and the nature of the work to be performed. Binding-screws 20 pass laterally through the cross-bars 13 and bear with their inner ends against the sides of the standards 14 so as to hold the latter in the located position. There will be as many of these binding-screws to each standard as may be found necessary to secure the same firmly in the required position, and, as shown, two binding-screws will be had for each standard. The foot portion of each cultivator-shovel will be attached to the lower end of its respective standard by means of a bolt 21 and a break-pin 22, the latter being of wood and adapted to give when the cultivator-shovel meets with a bowlder, root, or other unyielding obstruction, so as to permit the yielding of the shovel without causing an undue straining of the machine and the possible breakage of its parts.

The fenders are composed of similar short lengths of planking 23, which are arranged in longitudinal relation and secured to the ends of saddle-irons 24, which straddle the upper side of the beams and are secured thereto in any approved manner so as to admit of the ready detachment of the fenders when it is not required to use the same. The saddle-irons 24 are located at the ends of the plates or boards 23, and their side members slightly diverge at their lower ends to admit of the boards or plates 23 spreading at their lower edges to conform approximately to the sloping sides of the rows or ridges. L-irons 25 are attached to the boards 23 about midway of their ends, and the horizontal members of the said irons are formed with a series of openings 26 for the passage of the fastening bolt or screw by means of which the said irons 25 have adjustable connection with the under side of the cultivator-beams. By this means the lower edges of the boards or plates 23 can be spread more or less, according to the width of the ridges and the growth of the plants, as will be readily understood. Inasmuch as the parts 23 are wood, the various irons 24 and 25 can be adjustably connected therewith by wood-screws in the usual manner, thereby admitting of the fenders having a vertical adjustment to suit the height of the plants to be cultivated.

Bars or rods 27 are secured at their front ends to the members of the pole or tongue and are braced and strengthened by an arch 28, which is secured at its ends to the axle, and which is braced midway of its ends by a stay 29. The bars or rods 27 extend over the cultivator-beams and are intended to support the latter when it is not required to have the machine perform any work, and short chains 30 are secured at their lower ends to the cultivator-beams and are adapted to be adjustably connected with hooks 31 near the rear ends of the said bars 27.

Obviously the rear ends of the cultivator-beams can be supported at any distance from the surface of the ground, thereby making provision for cultivating to any required depth. By reason of the pivotal connection of the cultivator-beams with the couplings 11 the said beams can be swung laterally at their rear ends to adapt the fenders and the cultivator-shovels to any inequalities in the rows or ridges, and these beams are moved and guided by means of the attendant through the instrumentality of the handles 32, which latter have pivotal connection at their lower ends with the respective beams and have adjustable connection with standards 33 rising vertically from the cross-bars 13, thereby adapting the height of the upper ends of the handles to the ease and comfort of the attendant.

The cultivator herein described is especially designed for walking, and when it is required to adapt the same for riding, the handles 32, the bars 27, and the arch 28 will be dispensed with, and the provisions shown most clearly in Fig. 2 will be resorted to, and the same consist of arched bars 34 extending in longitudinal relation and having their front ends secured to the axle 1 in any desired manner, and having their rear ends connected and provided with transverse plates 35, which are vertically apertured for the reception of a vertical stem or journal 36 disposed at the front end of a frame 37, having caster-wheels 38 journaled to the terminal ends of its side members. A seat 39 is placed upon the arch of the bars 34 and the driver perches thereupon when riding. A transverse bar or plate 40 is attached to the arched portion of the bars 34 in advance of the seat 39 and has vertical extensions 41 at its ends, and cam-levers 42 are journaled in these vertical extensions and are supplied with the ordinary hand-latch 43, which engages with one of a series of teeth formed in the upper edge of the adjacent vertical extension so as to hold the cam-levers in the required position. The chains 30, or their equivalent, are attached at their upper ends to the cam-levers, and by a proper manipulation of the latter the cultivator-beams can be raised or lowered, as required. The driver perched upon the seat 39 rests his feet upon the cultivator-beams and when required can exert sufficient force to hold the cultivator-shovels to their work, and by a proper manipulation of his feet can move the cultivator-beams laterally to direct the cultivator-shovels to the required work. Oppositely-disposed braces 44 extend from near the outer ends of the axle 1 to the arched portions of the bars 34 and brace the latter and prevent independent lateral movement thereof.

For cultivating young plants the fenders are utilized so as to prevent the cultivator-shovels from covering or otherwise injuring them, and after the plants have attained a sufficient growth they can be cultivated without requiring the use of the fenders, in which event the latter will be laid aside. The cultivator-shovels can be adjusted vertically and laterally in the manner set forth to suit the particular nature of the work in hand, and the depth of the cultivation can be regulated by elevating or lowering the cultivator-beams either by means of the cam-levers 42 or by engaging the links of the chains 30 with the hooks 31, as previously intimated. When it is required to hold the cultivators out of working position, the beams 10 are lifted and the hooks 45 provided near their rear ends are engaged with the rods 27, as will be readily understood.

From what has been said it is obvious that the cultivator can be variously constructed. Hence in the adapting of the same for any particular purpose it is to be understood that various changes in the form, proportion, and the minor details of construction may be resorted to without departing from the principle or sacrificing any of the advantages of this invention.

Having thus described the invention, what is claimed as new is—

1. In a cultivator, the combination with an axle, and a series of cultivator-beams, of couplings having the cultivator-beams pivotally connected with their rear ends, and having their front ends notched, and having the inner closed ends of the notches oppositely beveled from a medial point and receiving the said axle, rollers closing the front ends of the notches and bearing against the front side of the axle, means for adjustably securing the couplings upon the axle, bars extending over the cultivator-beams, and adjustable connections between the beams and the said elevated bars to support the beams at any working elevation or hold them up when not in use, substantially as set forth.

2. In a cultivator, the combination with the cultivator-beam, of saddle-irons straddling and secured to the said beam and having their side portions diverging at their lower ends, and boards vertically adjustably secured to the side portions of the saddle-irons, substantially in the manner set forth for the purpose described.

3. In a cultivator, the combination with the beam, of saddle-irons straddling the beam, boards vertically adjustably attached to the side portions of the saddle-irons in the manner set forth, and irons adapted to be adjustably secured to the said boards and having their horizontal portions extending inwardly and adapted to be adjustably connected together and to the lower side of the aforesaid beam, substantially as set forth for the purpose described.

4. In a cultivator, the combination of the beam, having a cross-bar which is formed in its length with a series of vertically-disposed openings, cultivator-shovels having their standards adjustably fitted in any one of the series of openings, binding-screws for securing the cultivator-standards in the adjusted position, and a fender composed of longitudinal boards which are adapted to have a vertical and lateral adjustment between the said vertically and laterally adjustable cultivator-shovels, substantially in the manner set forth for the purpose described.

5. In combination, an axle provided with ground-wheels, beams adjustably connected with the axle and provided with cultivator-shovels, arched bars extending in longitudinal relation and rigidly secured to the axle, and mounted at their rear ends upon caster-wheels, a seat supported upon the arched portions of the bars, a transverse plate connecting the said bars and having vertical extensions, levers pivotally connected with the said vertical extensions, and connections between the levers and the aforesaid beams to admit of the vertical adjustment of the latter, substantially in the manner set forth for the purpose described.

6. The herein shown and described lister-cultivator, comprising an axle provided at its ends with ground-wheels, a pole comprising side bars spaced apart and connected at their ends by cross-bars, hounds rigidly connecting the inner ends of the said side bars with the axle, beams provided at their rear ends with short cross-bars, couplings adjustably mounted upon the axle and having the beams pivotally connected therewith so as to swing laterally at their rear ends, handles applied to the rear ends of the beams and adjustable vertically at their outer ends, rods 27 secured at their front ends to the members of the pole and extending rearwardly over the beams and braced from the axle by means of an arched stay, connections for adjustably suspending the beams from the rear ends of the rods 27, cultivator-shovels having their standards adjustably connected with the aforesaid short cross-bars, a break-pin connection between the cultivator-shovels and their standards, and fenders having their members located between the adjacent cultivator-shovels, substantially as specified.

In testimony that I claim the foregoing as my own I have hereto affixed my signature in the presence of two witnesses.

WILBER G. TEAL.

Witnesses:
C. P. CABEON,
A. F. JOHNSON.